(12) United States Patent
Niles

(10) Patent No.: US 11,383,363 B2
(45) Date of Patent: Jul. 12, 2022

(54) OIL FILTER REMOVAL TOOL AND METHOD OF USE

(71) Applicant: Clair D. Niles, Ottawa, KS (US)

(72) Inventor: Clair D. Niles, Ottawa, KS (US)

(*) Notice: Subject to any disclaimer, the term of this patent is extended or adjusted under 35 U.S.C. 154(b) by 776 days.

(21) Appl. No.: 16/273,578

(22) Filed: Feb. 12, 2019

(65) Prior Publication Data
US 2020/0254597 A1 Aug. 13, 2020

(51) Int. Cl.
*B25B 27/00* (2006.01)

(52) U.S. Cl.
CPC ...... *B25B 27/0042* (2013.01); *B01D 2201/24* (2013.01)

(58) Field of Classification Search
None
See application file for complete search history.

(56) References Cited

U.S. PATENT DOCUMENTS

| | | |
|---|---|---|
| 4,867,017 A | 9/1989 | Holman |
| 5,271,299 A | 12/1993 | Wadsworth |
| 7,241,385 B1 | 7/2007 | Cline |
| 7,340,979 B2 | 3/2008 | Sawyer |
| 7,637,120 B1* | 12/2009 | Doss ........................ F25D 3/02 62/378 |
| 7,707,912 B1 | 5/2010 | Sparks |
| 9,003,929 B2 | 4/2015 | Laurel |
| 2006/0053983 A1* | 3/2006 | Groetsch ............ B25B 27/0042 81/121.1 |
| 2012/0198970 A1* | 8/2012 | Robidoux .......... B25B 27/0042 81/121.1 |
| 2016/0303719 A1 | 10/2016 | Klamm |
| 2016/0325417 A1* | 11/2016 | Klamm ................ B25B 13/505 |
| 2017/0165820 A1 | 6/2017 | Leo |

* cited by examiner

*Primary Examiner* — Brian D Keller
(74) *Attorney, Agent, or Firm* — Law Office of Mark Brown, LLC; Christopher M. DeBacker

(57) ABSTRACT

An oil filter removal tool with a cavity for receiving the oil filter, a tapered base portion with reverse (e.g. left handed) threads for gripping the base of the oil filter, and a lip for capturing spilled oil. A wrench connection below the base portion of the tool fits a typical socket wrench head to allow for easy removal of the oil filter using a common tool. The reverse threads grip the base of the oil filter when being turned to the left, and as they tighten onto the filter, they grip tighter and tighter and then begin to loosen the filter. As the filter comes loose, any spilt oil will be captured within the cavity of the removal tool.

13 Claims, 4 Drawing Sheets

OIL FILTER REMOVAL TOOL AND METHOD OF USE

BACKGROUND OF THE INVENTION

1. Field of the Invention

The present invention relates generally to an oil filter removal tool and method for use thereof, and more specifically to an oil filter removal tool with reverse threads and wrench connection.

2. Description of the Related Art

Anyone who has removed, or tried to remove, an oil filter from their vehicle has no doubt run into some complication, whether it is difficulty in grasping and removing the filter itself, or dealing with spilt oil upon beginning to loosen and removing the filter. While some tools exist to help deal with this issue, such as oil filter removal wrenches, these tools cannot fit or be easily used in tight locations and do not help to deal with the spilt oil.

Heretofore there has not been available a system or method for an oil filter removal tool with the advantages and features of the present invention.

BRIEF SUMMARY OF THE INVENTION

The present invention generally provides an oil filter removal tool with a cavity for receiving the oil filter, a tapered base portion with reverse (e.g. left handed) threads for gripping the base of the oil filter, and a lip for capturing spilled oil. A wrench connection below the base portion of the tool fits a typical socket wrench head to allow for easy removal of the oil filter using a common tool. The reverse threads grip the base of the oil filter when being turned to the left, and as they tighten onto the filter, they grip tighter and tighter and then begin to loosen the filter. As the filter comes loose, any spilt oil will be captured within the cavity of the removal tool.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
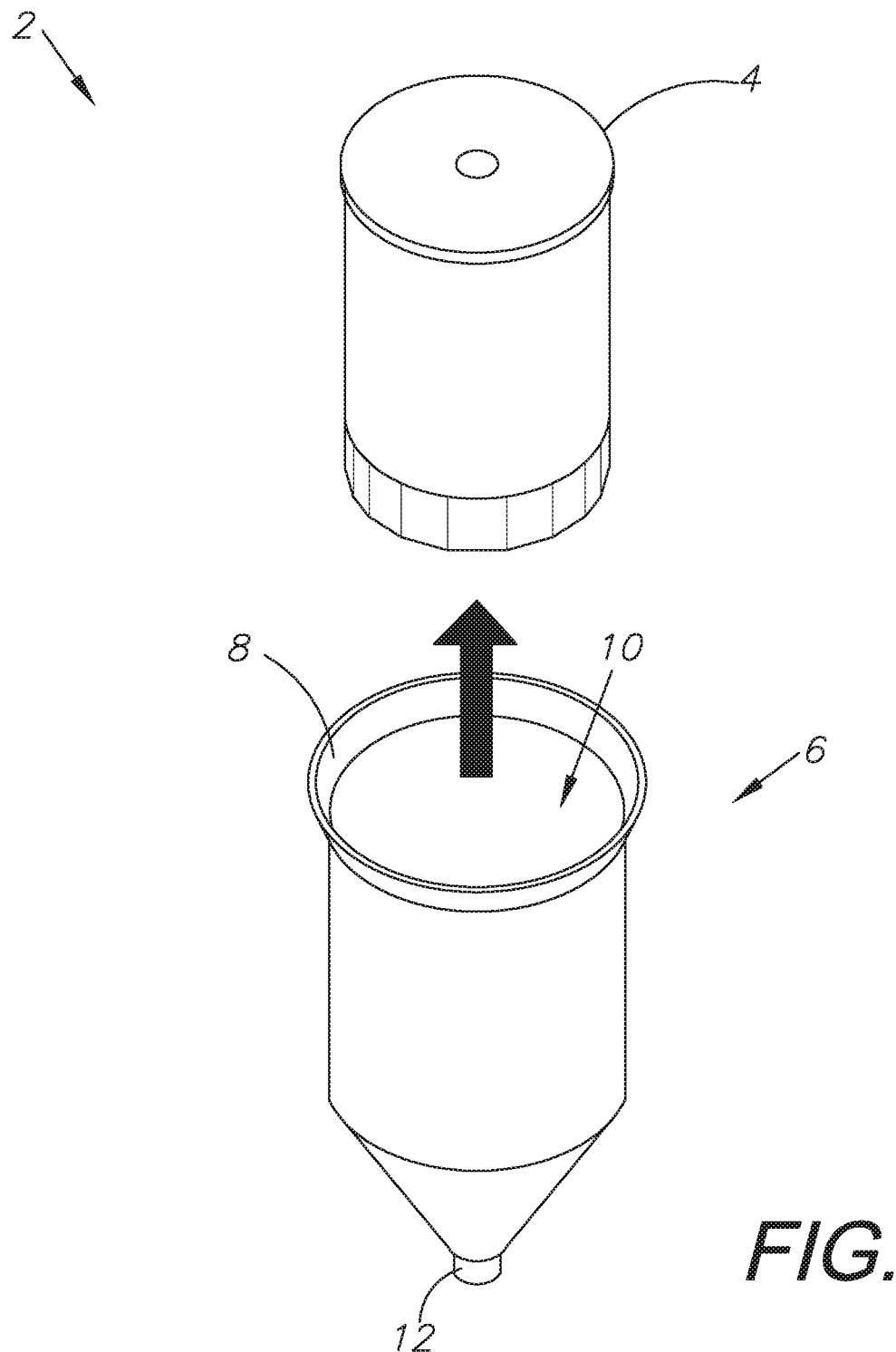
FIG. 1 is a three-dimensional isometric view of a preferred embodiment of the present invention shown interacting with a typical environment in an oil filter.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Oil Filter Removal Tool System 2

As shown in the figures, the present invention provides an oil filter removal tool system 2 including a tool 6 for removing an oil filter 4 from a vehicle. The tool 6 includes an internal cavity 10 for receiving the filter 4 when removing it, and also includes a lip 8 for capturing oil from the vehicle as the filter 4 is being removed. The oil can be captured within the cavity 10. A wrench connection 12 at the bottom of the tool allows for the user to connect a common socket wrench 24 to the socket receiver 14 to make it easy to remove the tool. The socket receiver is a simple square receptacle for receiving a standard socket wrench.

Figure 2:
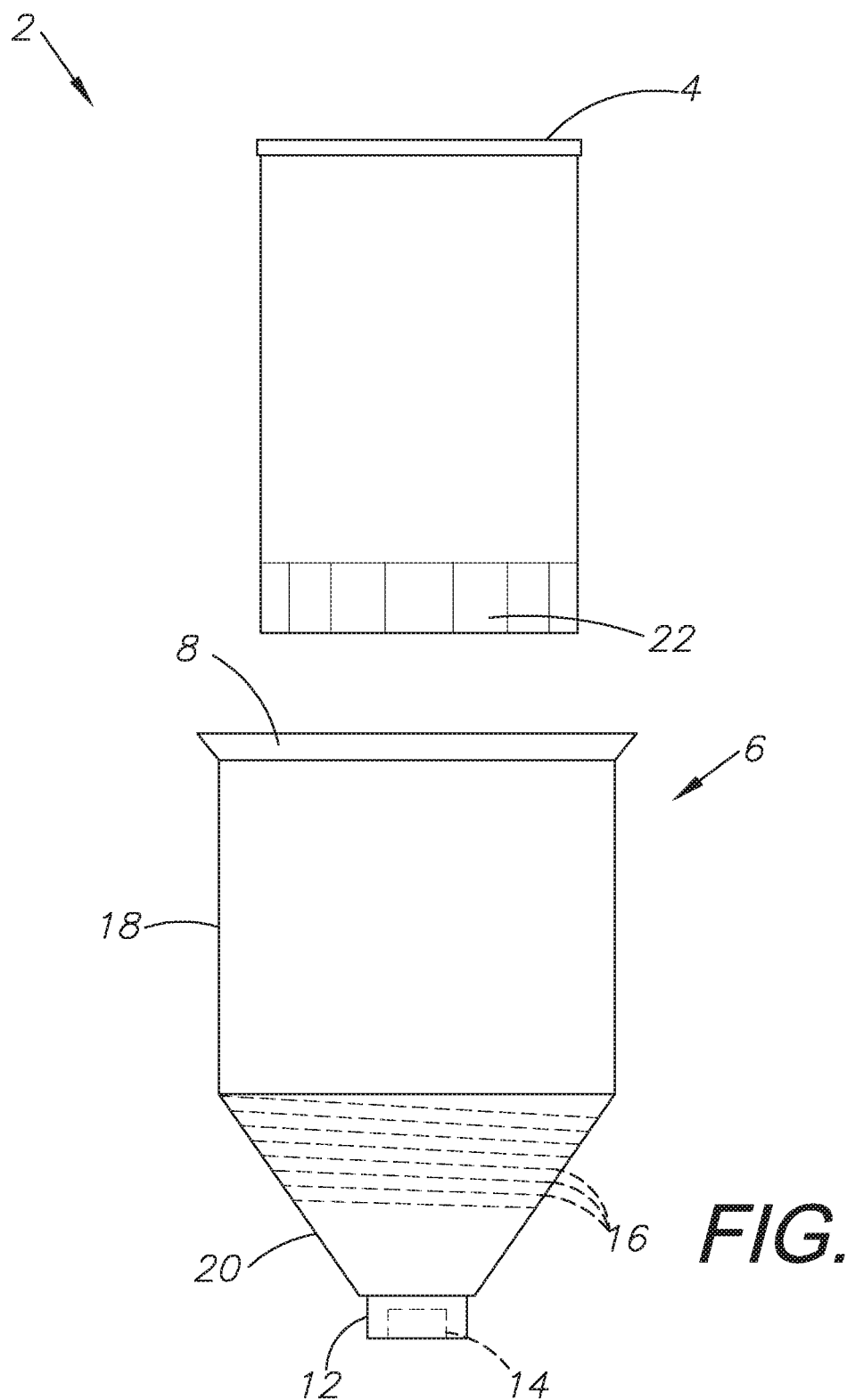
FIG. 2 is a side elevational view thereof, showing the embodiment thereof before connecting with the filter.
Figure 3:
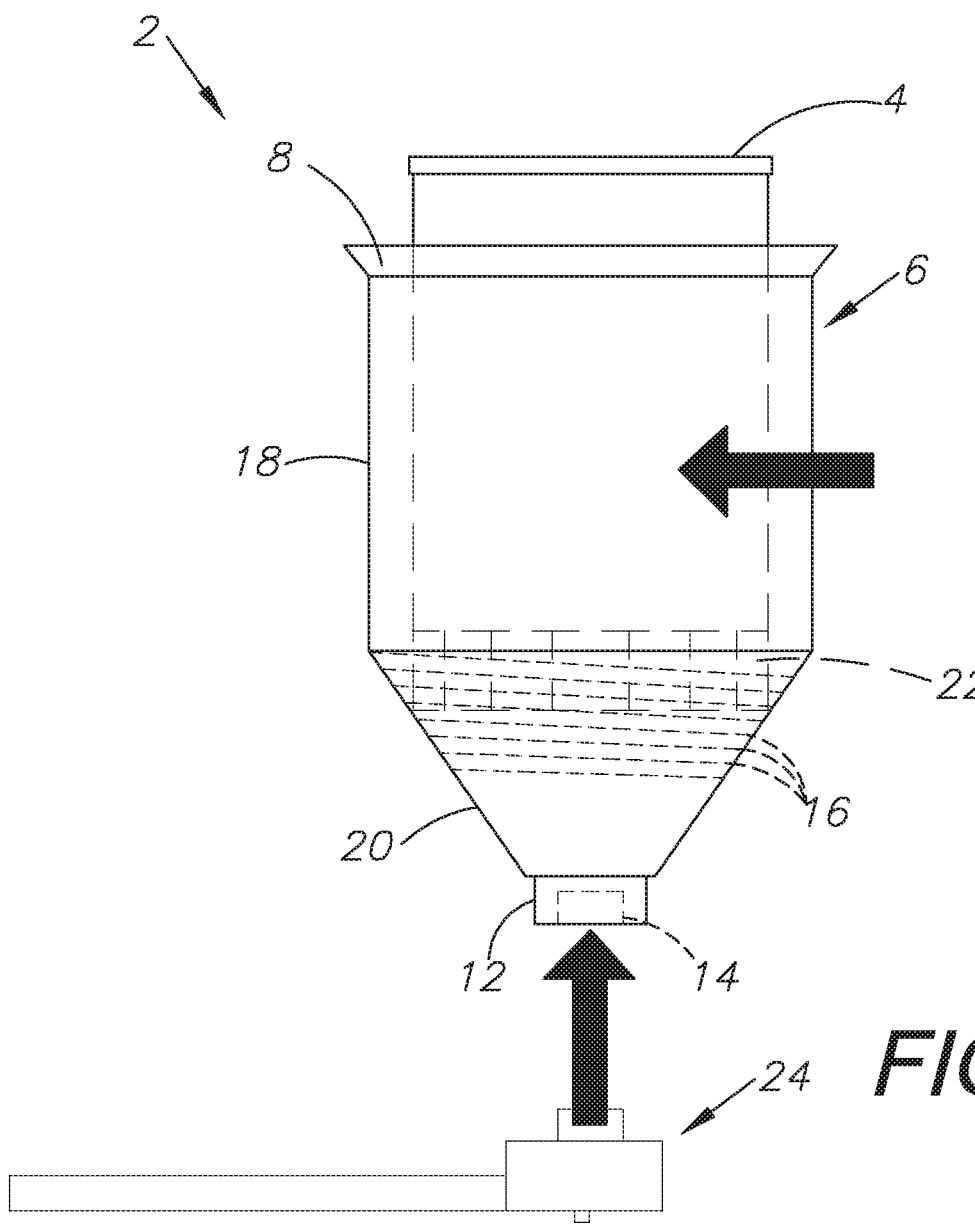
FIG. 3 is a side elevational view thereof, showing the embodiment thereof when connected to the filter.
Figure 4:
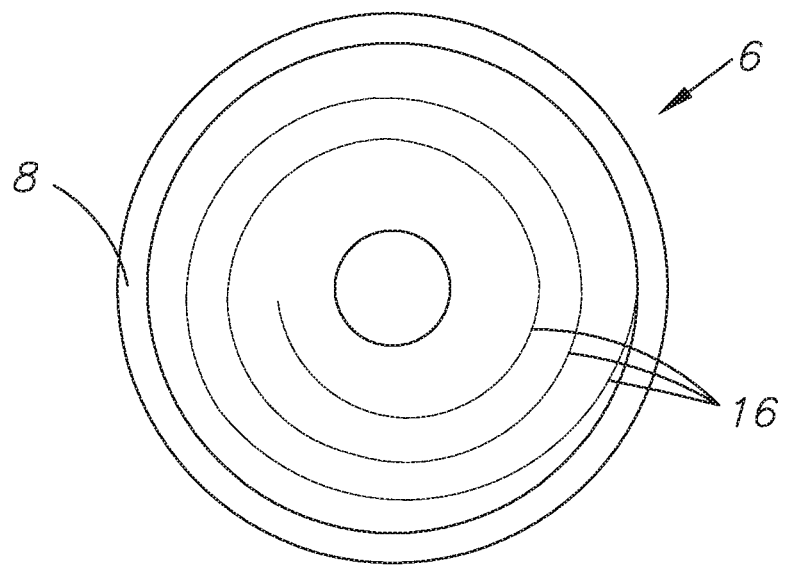
FIG. 4 is a top plan view of the embodiment thereof.
Figure 5:
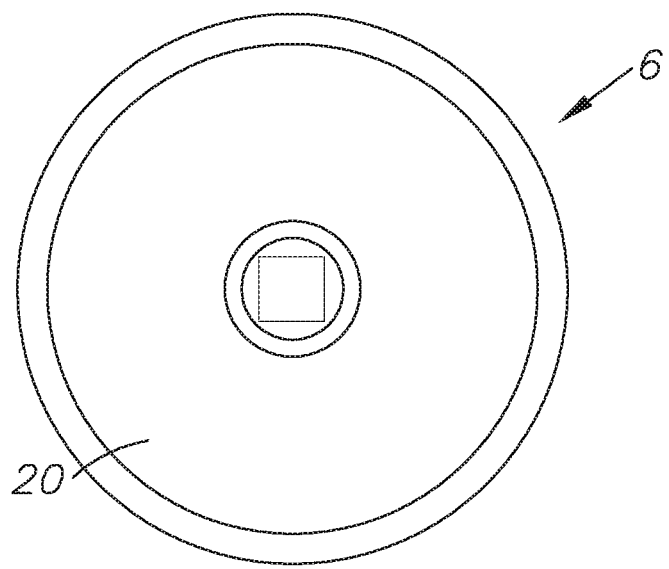
FIG. 5 is a bottom plan view of the embodiment thereof.

FIG. 2 shows the reverse (e.g. left handed) threads 16 within the tapered base portion 20 of the tool. As the tool 6 is placed over the filter 4, as shown in FIG. 3, the reverse threads 16 grip the base portion 22 of the filter. Typically this base portion 22 of the filter is covered with a rubberized material to help with hand-gripping the filter when loosening or tightening, however the present invention will work with an oil filter having a base portion 22 made of any suitable material. The reverse threads 16 will grip to any material however, and as the tool 6 is turned left to loosen the filter 4, the threads will get tighter and tighter onto the base 22 of the filter 4.

The tapered base portion 20 of the tool 6 allows the tool to accommodate an oil filter 4 of virtually any typical diameter. This allows a single one-sized tool 6 to be used to remove most currently used engine oil filters 4, which generally range from 2.9 inches in diameter to 4.2 inches in diameter. The threads 16 inside of the tapered base portion 20 will grip the base portion 22 of the filter 4 no matter how large or small the filter's diameter. This means the user only needs the single tool 6 and a wrench 24 to remove any filters 4 that they may need to remove.

As the filter is loosened, the oil from the vehicle will spill over the sides of the filter and be captured by the lip 8 of the tool 6, and stored within the cavity 10 of the upper portion 18 of the tool 6.

The internal cavity 10 does not necessarily need to be able to old all oil stored within the oil pan, but is primarily designed merely to capture the oil which spills when removing the filter 4. However, it could be designed to hold more.

The tool 6 is preferably made of a single piece of material which may be cast or molded, and includes no moving parts.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An oil filter removal tool system comprising:
    an oil filter removal tool having a rigid cylindrical top portion and a rigid cone-shaped base portion forming an interior cavity configured to receive the oil filter;

said cone-shaped base portion comprising reverse threads within an interior space of the cone-shaped base portion, said reverse threads configured for gripping a base portion of said oil filter as said oil filter removal tool is turned left to loosen said oil filter;

a lip extended out and away from a top edge of said cylindrical top portion configured to capture oil spilled from said oil filter;

said cylindrical top portion comprising an interior configured for receiving and storing said oil; and a wrench connector below said cone-shaped base portion configured for receiving a wrench to turn said oil filter removal tool.

2. The oil filter removal tool of claim 1, wherein said interior cavity is further configured to receive oil spilled from said oil filter.

3. The oil filter removal tool of claim 1, wherein said oil filter comprises a diameter between 2.9 inches and 4.2 inches.

4. The oil filter removal tool of claim 1, further comprising:
said wrench comprising a socket wrench comprising a square socket; and
said wrench connector comprising a square receptacle for receiving the square socket of the wrench, thereby engaging said wrench and enabling said wrench to apply rotational force to said oil filter removal tool and thereby said oil filter.

5. The oil filter removal tool of claim 1, wherein said cylindrical top portion, said cone-shaped base portion, said lip, and said wrench connector are formed from a single piece of material.

6. An oil filter removal tool system comprising:
an oil filter removal tool having a rigid cylindrical top portion and a rigid cone-shaped base portion forming an interior cavity configured to receive the oil filter and further configured to retain spilled oil from said oil filter;
said cone-shaped base portion comprising reverse threads within an interior space of the cone-shaped base portion, said reverse threads configured for gripping a base portion of said oil filter as said oil filter removal tool is turned left to loosen said oil filter;
a lip extended out and away from a top edge of said cylindrical top portion configured to capture oil spilled from said oil filter;
said cylindrical top portion comprising an interior configured for receiving and storing said oil;
a wrench connector below said cone-shaped base portion, said wrench connector comprising a socket and being configured for receiving a socket wrench to turn said oil filter removal tool; and
wherein said cylindrical top portion, said cone-shaped base portion, said lip, and said wrench connector are formed from a single piece of material.

7. A method of removing an oil filter from a vehicle, the method comprising the steps:
placing an oil filter removal tool over an oil filter attached to a vehicle, said oil filter removal tool comprising a rigid cylindrical top portion and a rigid cone-shaped base portion forming an interior cavity which receives said oil filter within it;
wherein said cylindrical top portion comprises a lip extending out and away from a top edge of said cylindrical top portion, said lip configured for catching spilled oil from said oil filter;
twisting said oil filter removal tool in a clockwise direction about said oil filter such that reverse threads located within said cone-shaped base portion grip said oil filter about a base of said oil filter;
twisting said oil filter removal tool further in a counter-clockwise direction about said oil filter, loosening said oil filter from said vehicle; and
twisting said oil filter removal tool further in a counter-clockwise direction about said oil filter, thereby removing said oil filter from said vehicle.

8. The method of claim 7, further comprising the steps:
capturing oil from said oil filter within said interior cavity via a lip surrounding a top edge of said cylindrical top portion of said oil filter removal tool; and
preventing spilling of said oil via said lip.

9. The method of claim 7, further comprising the steps:
connecting a wrench to a wrench connector located beneath said cone-shaped base portion; and
turning said oil filter removal tool with said wrench.

10. The method of claim 9, wherein:
said wrench comprising a standard socket wrench comprising a socket; and
said wrench connector comprising a socket receiver for receiving the socket of the wrench.

11. The method of claim 7, wherein said lip comprises a tapered edge.

12. The method of claim 7, wherein said oil filter comprises a diameter between 2.9 inches and 4.2 inches.

13. The method of claim 7, wherein said cylindrical top portion, said cone-shaped base portion, said lip, and said wrench connector are formed from a single piece of material.

* * * * *